(12) United States Patent
Watanabe

(10) Patent No.: US 9,188,777 B2
(45) Date of Patent: Nov. 17, 2015

(54) IMAGE PICKUP APPARATUS CAPABLE OF PREVENTING FOREIGN MATTERS FROM ADHERING TO OPTICAL MEMBER

(71) Applicant: CANON KABUSHIKI KAISHA, Tokyo (JP)

(72) Inventor: Naoki Watanabe, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 335 days.

(21) Appl. No.: 13/776,789

(22) Filed: Feb. 26, 2013

(65) Prior Publication Data

US 2013/0221200 A1   Aug. 29, 2013

(30) Foreign Application Priority Data

Feb. 27, 2012   (JP) .................. 2012-040020

(51) Int. Cl.
    *G03B 11/00*    (2006.01)
    *G02B 27/00*    (2006.01)

(52) U.S. Cl.
    CPC ............ *G02B 27/0006* (2013.01); *G03B 11/00* (2013.01); *G03B 2205/0061* (2013.01)

(58) Field of Classification Search
    CPC combination set(s) only.
    See application file for complete search history.

(56) References Cited

FOREIGN PATENT DOCUMENTS

JP   2009-033441 A   2/2009

OTHER PUBLICATIONS

English Machine Translation of Applicant supplied reference JP 2009-033441.*

* cited by examiner

*Primary Examiner* — Francis M Legasse, Jr.
(74) *Attorney, Agent, or Firm* — Rossi, Kimms & McDowell LLP

(57) ABSTRACT

An image pickup apparatus capable of preventing foreign matters from adhering to an optical member and excellent in assembly workability. A light shield mask has a base member affixed to an object side of an optical low pass filter, which is disposed on an object side of an imaging device. An electrically conductive sheet affixed to the base member of the light shield mask is urged by an electrically conductive urging member toward the optical low pass filter. Through the electrically conductive sheet and the electrically conductive urging member mounted to a main unit chassis, the optical low pass filter is electrically connected to the main unit chassis that provides reference potential.

8 Claims, 13 Drawing Sheets

(PHOTOGRAPHER SIDE)

440

POSITIVE-PHASE

G-PHASE

440a (OBJECT SIDE)

G-PHASE

440a

IMAGE PICKUP APPARATUS CAPABLE OF PREVENTING FOREIGN MATTERS FROM ADHERING TO OPTICAL MEMBER

BACKGROUND OF THE INVENTION

1. Field of the Invention

The present invention relates to an image pickup apparatus having an imaging device and an optical member such as an optical filter, and more particularly, to an image pickup apparatus capable of preventing foreign matters such as dust from adhering to an optical member.

2. Description of the Related Art

An electronic image pickup apparatus such as a digital still camera or a video camera is excellent in immediacy and in compatibility with a personal computer and therefore has been rapidly widespread. The electronic image pickup apparatus having an imaging device on which an object image is formed by an image pickup optical system such as lenses and by which the object image is photoelectrically converted into image data. In general, an optical member such as an optical low pass filter or an infrared cut filter is disposed between the imaging device and the image pickup optical system.

In the image pickup apparatus, foreign matters such as dust sometimes adhere to the imaging device or to the optical member. For example, in a digital single-lens reflex camera having a replaceable lens, dust or the like, which is generated in a mechanical operation part such as a shutter or a quick return mirror, adheres to a surface of a cover glass of the imaging device or to a surface of the optical member such as an optical filter, which are disposed near the operation part. Upon lens replacement, foreign matters such as dust enter into the camera main unit through an opening of a lens mount and adhere to e.g. the optical member. In that case, images of foreign matters are included in a captured image, resulting in a degraded appearance of the image.

To obviate this, there has been proposed an image pickup apparatus capable of removing foreign matters such as dust adhered to an optical member, which is disposed in front of an imaging device (see, for example, Japanese Laid-open Patent Publication No. 2009-33441).

In the proposed image pickup apparatus, an electrically conductive tape affixed to a surface of the optical member is pressed by an electrically conductive elastic member to make the potential at the surface of the optical member equal to that of the electrically conductive elastic member connected to a reference potential portion of a camera main unit, thereby making the potential at the surface of the optical member equal to the reference potential, whereby dust or the like can be prevented from adhering to the optical member due to electrostatic force generated when the surface of the optical member is charged.

However, the above-described construction requires an assembly step of affixing the electrically conductive tape to the optical member. The electrically conductive tape is generally soft and small in elasticity, and is therefore easy to be deformed during the assembly work. In addition, the electrically conductive tape is small in size. This results in poor assembly workability.

SUMMARY OF THE INVENTION

The present invention provides an image pickup apparatus capable of preventing foreign matters from adhering to an optical member and excellent in assembly workability.

According to one aspect of this invention, there is provided an image pickup apparatus having an imaging device that converts an optical image of an object into an electrical signal, comprising an optical member disposed on an object side of the imaging device, a light shield member having an opening formed into a shape corresponding to a shape of an effective pixel area of the imaging device, the light shield member being affixed to an object-side face of said optical member, an electrically conductive urging member disposed on an object side of the optical member and configured to urge the light shield member toward the optical member, an electrically conductive member affixed to the light shield member and configured to be in contact with the object-side face of the optical member, and a reference potential member configured to provide electrical reference potential and configured to be electrically connected to the electrically conductive urging member, wherein the electrically conductive urging member urges the electrically conductive member to the object-side face of the optical member such that the electrically conductive urging member is in contact with the electrically conductive member and the electrically conductive member is in contact with the object-side face of the optical member.

With this invention, it is possible, with a simple operation, to make the potential at the surface of the optical member disposed on the object side of the imaging unit equal to the reference potential, thereby preventing foreign matters such as dust from adhering to the optical member due to static electricity and improving the assembly workability of the image pickup apparatus.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
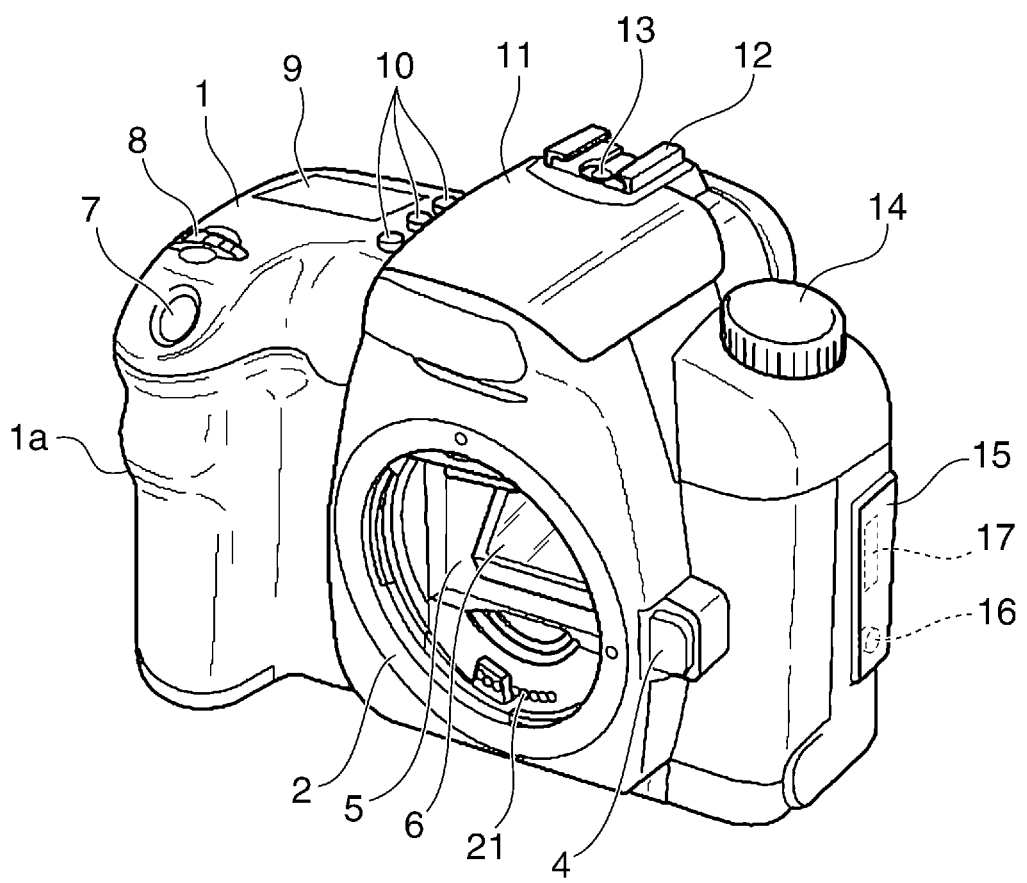
FIG. 1 is a front perspective view of a camera main unit of a digital single-lens reflex camera, which is an example of an image pickup apparatus according to one embodiment of this invention.
Figure 2:
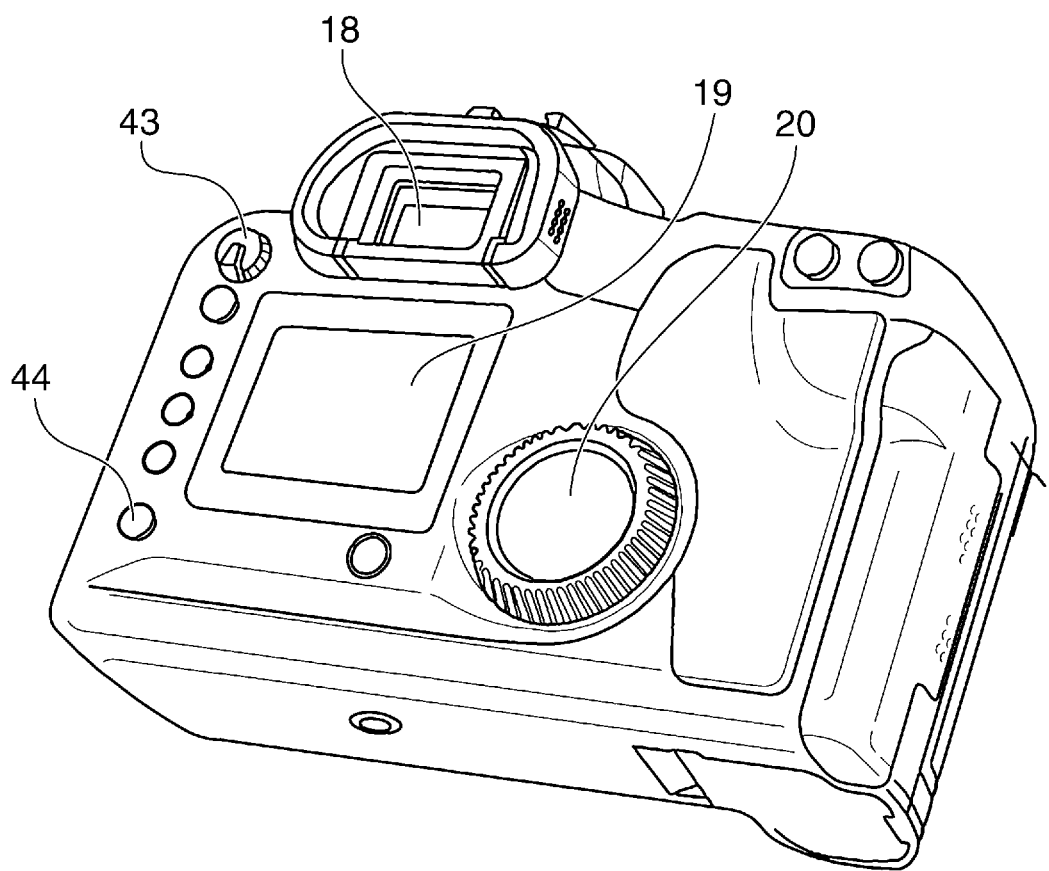
FIG. 2 is a rear perspective view of the camera main unit.
Figure 3:
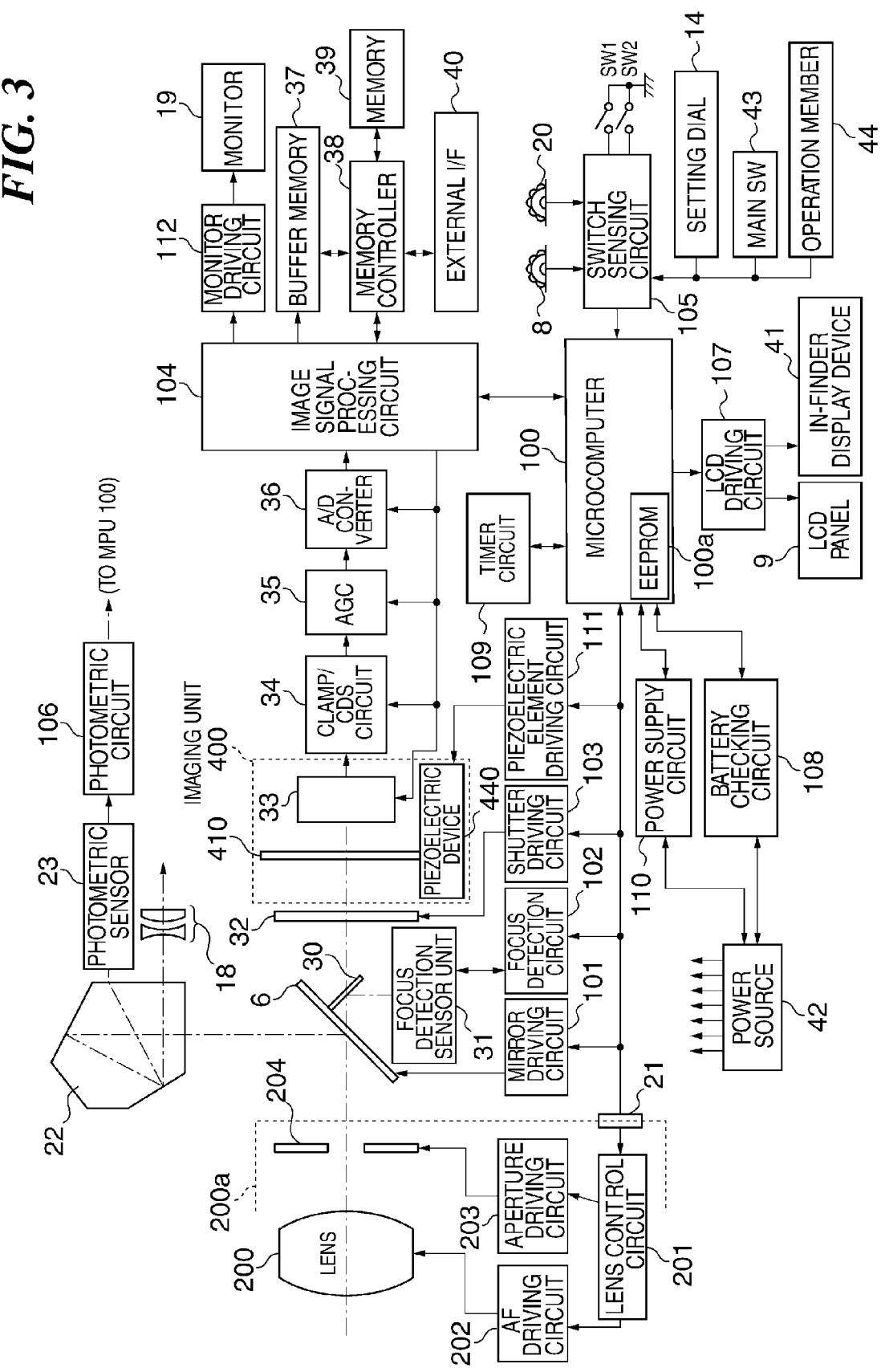
FIG. 3 is a block diagram showing the construction of a principal electrical circuit of the camera.

FIG. 1 shows, in front perspective view as seen from an object side, an outer appearance of a camera main unit of a digital single-lens reflex camera, which is an example of an image pickup apparatus of one embodiment of this invention. FIG. 2 shows an outer appearance of the camera main unit in rear perspective view as seen from a photographer/user side. FIG. 3 shows in block diagram the construction of a principal electric circuit of the camera.

As shown in FIGS. 1 to 3, the camera main unit 1 has a mounting portion 2 to which a photographing lens unit 200a is removably mounted and which is provided with a mount contact 21 through which various signals such as a control signal, status signal, and data signal are communicated between the camera main unit 1 and the photographing lens unit 200a. On the left side of the camera main unit 1, a lens lock release button 4 is provided. The photographing lens unit 200a can be detached from the camera main unit 1 by rotating the photographing lens unit 200a about an optical axis, with the lens lock release button 4 kept pressed.

Inside the camera main unit 1, there is provided a mirror box 5 to which a photographing light flux passing through a photographing lens 200 of the photographing lens unit 200a is guided. A main mirror 6 formed by a half mirror and held at a first predetermined angle relative to a photographing optical axis and a sub mirror 30 held at a second predetermined angle relative to the photographing optical axis are disposed inside the mirror box 5. Part of the photographing light flux passing through the photographing lens 200 is reflected by the main mirror 6 and guided to a penta-Dach mirror 22. Another part of the photographing light flux passes through the main mirror 6 and is reflected by the sub mirror 30 and guided to a focus detection sensor unit 31.

The main mirror 6 is movable between a position where it guides the photographing light flux to the penta-Dach mirror 22 and a position where it is retracted from a photographing optical path and guides the photographing light flux to an imaging device 33. The sub mirror 30 is movable between a position where it guides the photographing light flux to the focus detection sensor unit 31 and a position where it is retracted from the photographing optical path and guides the photographing light flux to the imaging device 33.

A grip portion 1a formed into a shape easy to be gripped by the photographer is provided at one end portion (right end portion in this embodiment) of the camera main unit 1.

On the right side of an upper surface of the camera main unit 1, there are disposed a release button 7 for starting photographing, a main-operation dial 8 for setting shutter speed and lens aperture value according to photographing mode, an LCD panel 9, and an operation mode setting button 10. The release button 7 is configured when pressed by a first stroke (i.e., half-pressed) to turn on a switch SW1, and configured when pressed by a second stroke (i.e., fully pressed) to turn on a switch SW2. The operation mode setting button 10 is operated to set whether continuous photographing or one-frame photographing should be performed when the release button 7 is pressed once, and operated to set white balance, AF follow-up mode, or the like. The setting statuses are displayed on the LCD panel 9.

At an upper central part of the camera main unit 1, there are provided an electronic flash unit 11 that pops up from the camera main unit 1 and a shoe groove 12 to which an accessory such as an external electronic flash is removably attached and in which an electrical contact 13 is disposed.

On the left side of the camera main unit 1, there are provided a photographing mode setting dial 14, an openable external terminal cover 15, and a video signal output jack 16 and a USB output connector 17 which are exposed to the outside when the external terminal cover 15 is open.

As shown in FIG. 2, the camera main unit 1 has a rear face provided with a finder eyepiece window 18 through which a photographer can confirm a photographing light flux (object image) passing through the penta-Dach mirror 22, a color liquid crystal monitor 19 on which an image or the like is displayed, and a sub-operation dial 20 that assists a function of the main-operation dial 8.

When the photographing mode is e.g. an AE mode, the sub-operation dial 20 is used to set an amount of exposure correction that corresponds to an appropriate exposure value calculated by an auto exposure device. In a manual photographing mode, the main-operation dial 8 is used to set a shutter speed, and the sub-operation dial 20 is used to set a lens aperture value. The sub-operation dial 20 is also used to select one from among photographed images that is to be displayed on the color liquid crystal monitor 19.

On the rear face of the camera main unit 1, there are provided a main switch 43 for turning on and off a power source 42 (FIG. 3) to start and stop an operation of the camera, and a cleaning instruction operation member 44 for instructing execution of a cleaning mode to remove, by vibration, foreign matters such as dust adhered to a surface of an optical low pass filter 410. The details of the cleaning mode and the cleaning instruction operation member 44 will be described later. It should be noted that it is not inevitably necessary to use a mechanical button such as the cleaning instruction operation member 44 to instruct execution of the cleaning mode. Execution of the cleaning mode can be instructed from a menu displayed on the color liquid crystal monitor 19 using a cursor key, an instruction button, or the like.

As shown in FIG. 3, a camera control system includes an MPU 100 for controlling operations of respective parts of the camera. The MPU 100 is built in the camera main unit 1 and incorporates an EEPROM 100a that stores pieces of information such as timer information obtained by a timer circuit 109.

The MPU 100 is connected with a mirror driving circuit 101, focus detection circuit 102, shutter driving circuit 103, image signal processing circuit 104, switch sensing circuit 105, photometric circuit 106, LCD driving circuit 107, battery checking circuit 108, timer circuit 109, power supply circuit 110, and piezoelectric element driving circuit 111. These circuits 101 to 111 each operate under the control of the MPU 100.

The MPU 100 communicates with a lens control circuit 201 of the photographing lens unit 200a through the mount contact 21. The lens control circuit 201 drives a photographing lens 200 and an aperture 204 of the photographing lens unit 200a through an AF driving circuit 202 and an aperture driving circuit 203 in accordance with control signals from the MPU 100. It should be noted that only the one photographing lens 200 is illustrated in FIG. 3 for convenience of illustration, but in actuality many lens groups including a focus lens are provided.

The AF driving circuit 202 includes a stepping motor and drives the stepping motor according to a control signal from the lens control circuit 201 so as to change the position of the focus lens, thereby focusing a photographing light flux on the imaging device 33. The aperture driving circuit 203 is constituted by e.g. an auto-iris and changes an optical aperture value of the aperture 204 according to a control signal from the lens control circuit 201.

The mirror driving circuit 101 includes e.g. a DC motor and a gear train, and drives the DC motor to move the main mirror 6 between a position where an object image can be observed through the finder eyepiece window 18 and a position where the main mirror 6 is retracted from the photographing optical path. The sub mirror 30 is driven in synchronism with the drive of the main mirror 6 between a position where a photographing light flux is guided to the focus detection sensor unit 31 and a position where the sub mirror 30 is retracted from the photographing optical path.

The focus detection sensor unit 31 includes a field lens disposed near an imaging face (not shown), a reflection mirror, a secondary imaging lens, an aperture, and a line sensor having CCDs, and performs focus detection based on a phase difference method. A signal that is output from the focus detection sensor unit 31 is supplied to the focus detection circuit 102 in which the signal is converted into an object image signal for transmission to the MPU 100.

The MPU 100 performs focus detection calculation based on the phase difference method in accordance with the object image signal to thereby calculate an amount of defocus and a defocus direction, and moves the focus lens to an in-focus position through the lens control circuit 201 and the AF driving circuit 202 in accordance with a calculation result.

The penta-Dach mirror 22 converts a photographing light flux reflected by the main mirror 6 into a normal upright image that is then reflected, thereby enabling the photographer to view an object image through the finder eyepiece window 18. Part of the photographing light flux is guided by the penta-Dach mirror 22 to the photometric sensor 23.

The photometric circuit 106 converts an output signal of the photometric sensor 23 into luminance signals for areas on a viewing surface, and outputs the luminance signals to the MPU 100. Based on the luminance signals, the MPU 100 calculates an exposure value.

A shutter unit 32 is a focal-plane mechanical shutter having front and rear shutter blades, and is driven by the shutter driving circuit 103. When the photographer is observing an object image through the finder eyepiece window 18, the front shutter blade is in a light-shielding position and the rear shutter blade is in an exposure position. At the time of photographing, the front shutter blade moves from the light-shielding position to the exposure position to permit object light to pass therethrough, whereby an image is picked up by the imaging device 33. After lapse of a desired shutter time from the start of exposure, the rear shutter blade moves from the exposure position to the light-shielding position, whereby the photographing is completed.

An imaging unit 400 includes the imaging device 33 that converts an object image into an electrical signal, the optical low pass filter (LPF) 410, and a piezoelectric element 440, which are integrated with other components (described later) into a unit. In this embodiment, a CMOS sensor is used as the imaging device 33. Alternatively, a CCD sensor or the like can be used. The LPF 410 is disposed on an object side of the imaging device 33 and is constituted by a single birefringent plate, which is made of quartz and formed into a rectangular shape. The piezoelectric element 440 is a vibration unit that causes the LPF 410 to vibrate, and is constituted by a piezoelectric element plate. The piezoelectric element 440 is driven by the piezoelectric element driving circuit 111. A vibration generated in the piezoelectric element 440 is conveyed to the LPF 410.

The camera control system includes a clamp/CDS (correlation double sampling) circuit 34, an AGC (auto gain control device) 35, and an A/D converter 36. The clamp/CDS circuit 34 performs basic analog processing on an analog image signal supplied from the imaging device 33, and can change a clamp level. The AGC 35 performs basic analog processing on an analog signal output from the clamp/CDS circuit 34, and can change a basic AGC level. The A/D converter 36 converts an analog output signal of the AGC 35 into a digital signal.

The image signal processing circuit 104 performs hardware image processing on the digital signal from the AGC 35, such as gamma/knee processing, filter processing, and information synthesis processing for monitor display. The image signal processing circuit 104 supplies image data for monitor display through a monitor driving circuit 112 to the color liquid crystal monitor 19 on which the image data is displayed.

In accordance with an instruction from the MPU 100, the image signal processing circuit 104 causes, through a memory controller 38, a buffer memory 37 to store image data, and performs compression processing on image data. In the case of continuous photographing, the image signal processing circuit 104 can cause the buffer memory 37 to temporarily store image data and can sequentially read unprocessed image data from the buffer memory 37 under the control of the memory controller 38. By doing this, the image signal processing circuit 104 is able to sequentially perform image processing and/or compression processing irrespective of input speed of image data from the A/D converter 36.

The memory controller 38 causes a memory 39 to store image data input from an external interface 40 (corresponding to the video signal output jack 16 and the USB output connector 17 which are shown in FIG. 2), and outputs image data stored in the memory 39 from the external interface 40. It should be noted that a flash memory or the like capable of being removably mounted to the camera main unit 1 can be used as the memory 39.

The switch sensing circuit 105 is connected with the switches SW1, SW2, the main-operation dial 8, the photographing mode setting dial 14, the sub-operation dial 20, the main switch 43, and the cleaning instruction operation member 44, which are previously described. The switch sensing circuit 105 transmits signals representing operation states of the switches, dials, etc. to the MPU 100.

The LCD driving circuit 107 drives the LCD panel 9 and an in-finder display device 41 in accordance with an instruction from the MPU 100. In accordance with an instruction from the MPU 100, the battery checking circuit 108 checks a battery of the power source 42 that supplies operating power to respective parts of the camera main unit 1 and the photographing lens unit 200a, and transmits a result of the checking to the MPU 100.

The timer circuit 109 measures a time period from when the main switch 43 is turned off to when the main switch 43 is next turned on, and transmits a result of the measurement to the MPU 100 in accordance with an instruction from the MPU 100.

Figure 4:
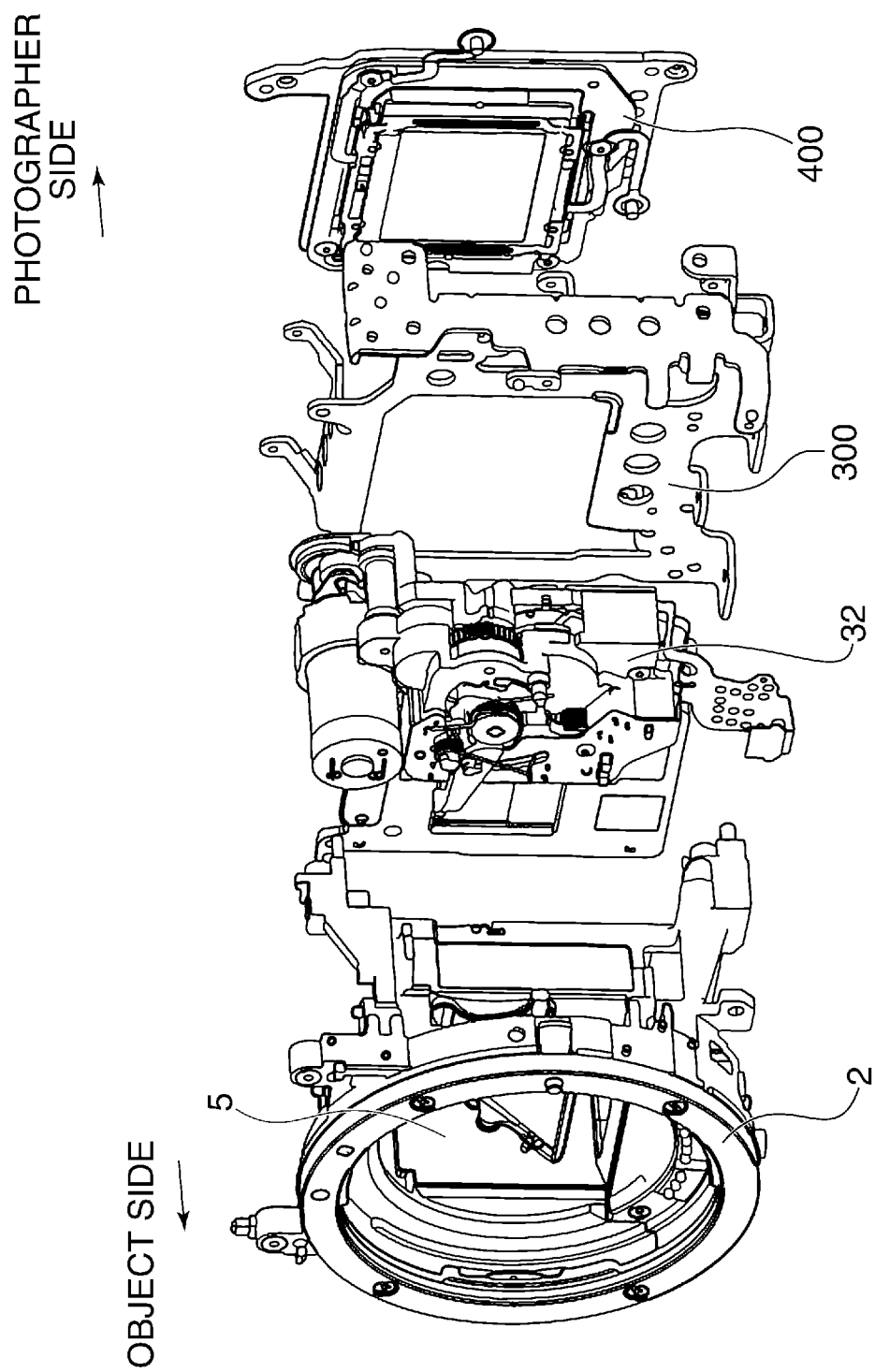
FIG. 4 is an exploded perspective view showing a structure that holds an imaging unit and its peripheral elements in the camera main unit.

FIG. 4 shows in exploded perspective view a structure that holds the imaging unit 400 and its peripheral elements in the camera main unit 1. Reference numeral 300 denotes a main unit chassis, which is a skeleton of the camera main unit 1. On an object side of the main unit chassis 300 (i.e., on the camera's front side), the mounting portion 2, the mirror box 5, and the shutter unit 32 are disposed and held. The imaging unit 400 is disposed and held on a photographer side of the main unit chassis 300 (i.e., on the camera's rear side).

The main unit chassis 300 is formed by a press-molded metal plate, and functions as a member that provides an electrical reference potential (hereinafter, referred to as the reference potential member). It should be noted that the main unit chassis 300 is not limited to one formed by a metal plate, but can be one obtained by insert-molding a resin component into a metal component, or one obtained by applying electrically conductive paint to a resin component, or one formed by electrically conductive resin. The main unit chassis 300 is not limited to one that provides reference potential, but can be one that is electrically connected to a component that provides reference potential.

As previously described, the imaging unit 400 includes the imaging device 33, the LPF 410, the piezoelectric element 440, etc. The imaging unit 400 is fixed to the mirror box 5 in a state that the imaging device 33 is adjusted to be disposed parallel to the mounting portion 2 of the camera main unit 1 and the image pickup face of the imaging device 33 is adjusted to be disposed at a predetermined distance from the mounting portion 2. It should be noted that it is not inevitably necessary to mount the imaging unit 400 to the mirror box 5. For example, the imaging unit 400 can be mounted to the main unit chassis 300.

Figure 5:
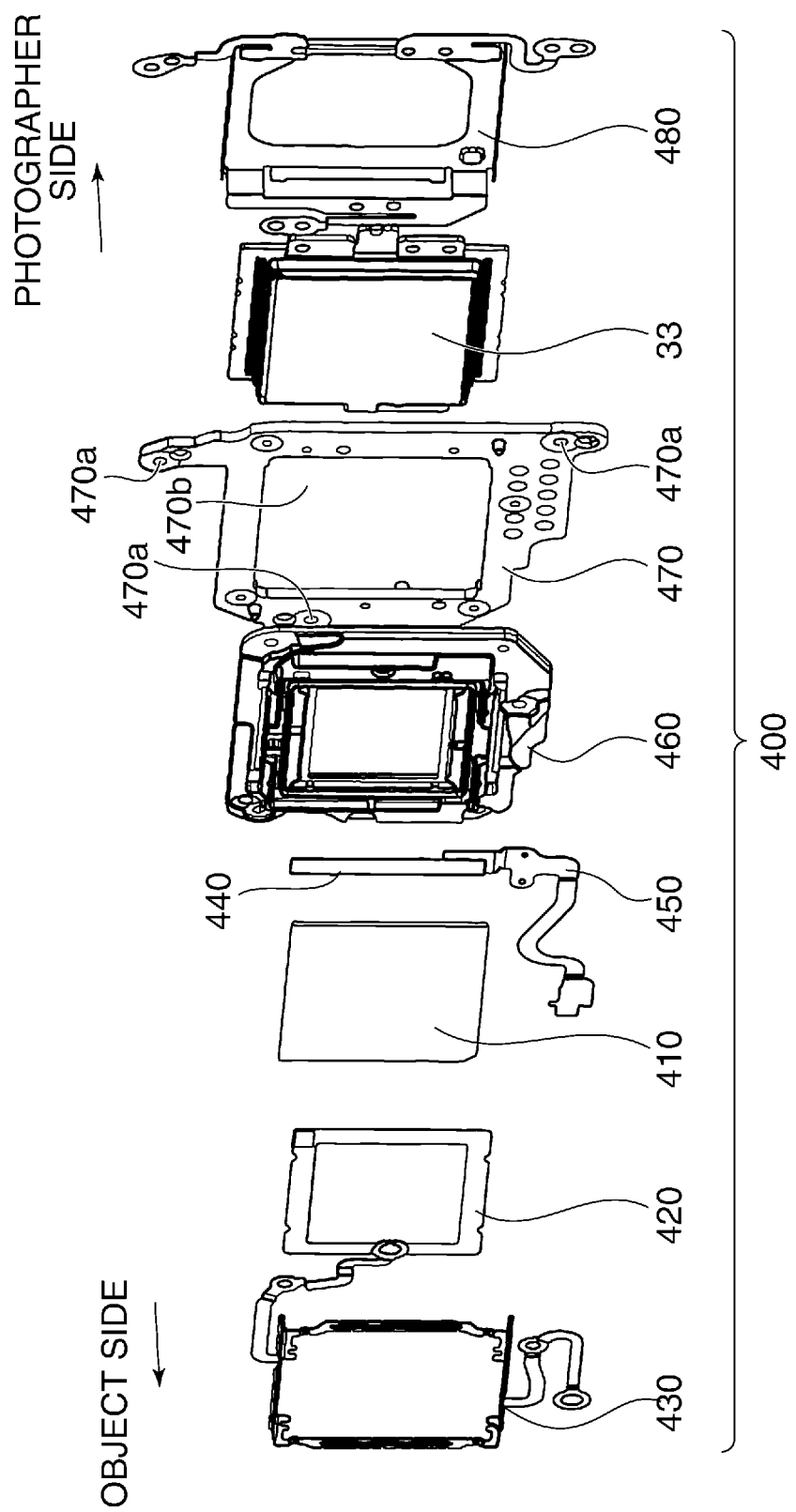
FIG. 5 is an exploded perspective view showing the construction of the imaging unit of the camera.

FIG. 5 shows the construction of the imaging unit 400 in perspective view. The imaging unit 400 includes an electromagnetic shield plate 480, imaging device 33, imaging device holding member 470, LPF holding member 460, piezoelectric element 440, flexible printed board 450, LPF 410, light shield mask 420, and electrically conductive urging member (hereinafter, sometimes referred to as the urging member) 430, which are disposed in this order from the photographer side to the object side.

The imaging device 33 of this embodiment includes a CMOS sensor as previously described. The imaging device 33 shown in FIG. 5 includes a CMOS sensor built in a package and an electric circuit board mounted to a rear face of the package.

The electromagnetic shield plate 480, which is disposed on the photographer side of the imaging device 33, is a rectangular frame obtained by e.g. press-molding a plated steel plate. The shield plate 480 shields electromagnetic noise from the electric circuit board of the imaging device 33, and reduces influence of electromagnetic noise from electrical components other than the electric circuit board.

The imaging device holding member 470 is a rectangular frame made of a metal plate and has a rectangular opening 470b formed therein. The imaging device 33 is fixed to the holding member 470 in a state that the CMOS sensor is exposed from the opening 470b. The imaging device holding member 470 is formed with three screw holes 470a around the opening 470b for threaded engagement with screws by which the holding member 470 is fixed to the mirror box 5.

The LPF holding member 460, which is a rectangular frame made of resin, holds the electrically conductive urging member 430 and the LPF 410 and is fixed to the imaging device holding member 470. The details of the LPF holding member 460 will be described later with reference to FIGS. 8A and 8B.

The LPF 410, which is disposed on the object side of the imaging device, is an optical member constituted by birefringent plate as previously described, and is formed into a rectangular shape. The LPF 410 has a surface applied with electrical conductive coating and optical coating such as antireflection coating.

The piezoelectric element 440 is bonded to a portion of the LPF 410 other than an effective photographing area, and is bonded with the flexible printed board 450 that applies a voltage to the piezoelectric element 440. The flexible printed board 450 is connected to the piezoelectric element driving circuit 111 (see FIG. 3), which is formed on an electric circuit board (not shown).

The light shield mask 420 has a function of preventing light reflected by a camera component in the camera main unit 1 from entering the imaging device 33 and has other functions, as will be described in detail later with reference to FIGS. 6A and 6B.

The electrically conductive urging member 430 is engaged with the LPF holding member 460, and urges the LPF 410 and the light shield mask 420 toward the photographer side. The details will be described later with reference to FIG. 7.

Figure 6A:
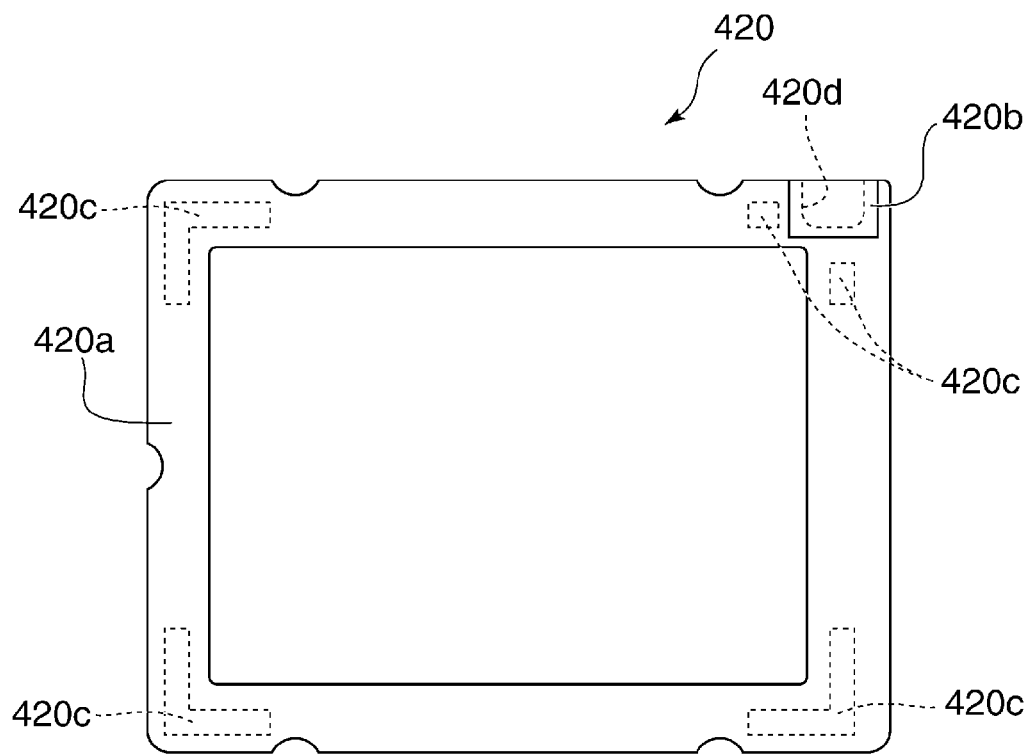
FIG. 6A is a front view showing the construction of a light shield mask of the imaging unit.
Figure 6B:
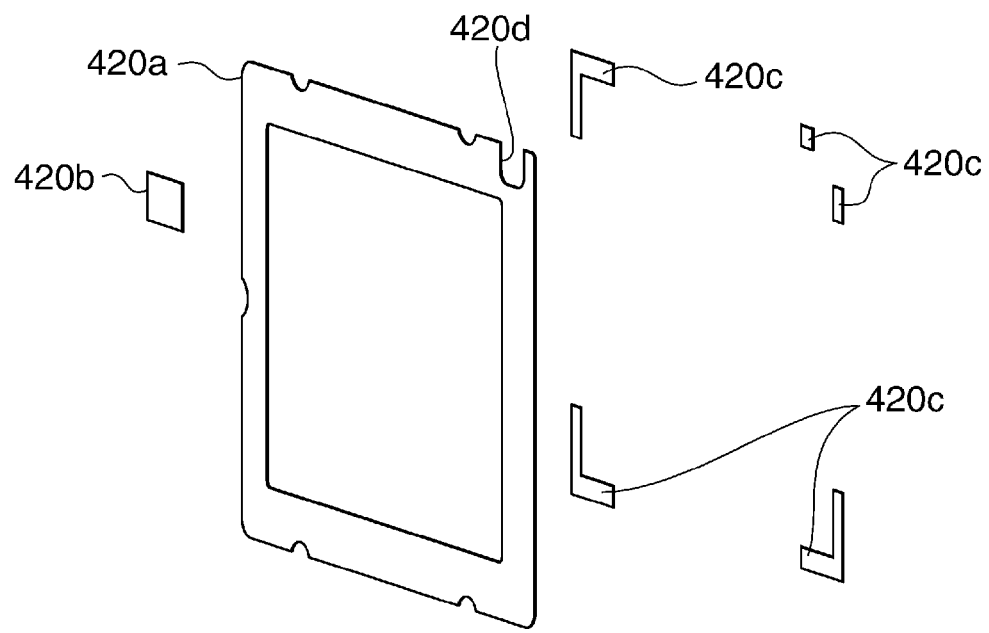
FIG. 6B is an exploded perspective view of the light shield mask.

FIG. 6A shows the light shield mask 420 in front view as seen from the object side, and FIG. 6B shows the light shield mask 420 in exploded perspective view.

The light shield mask 420 has a base member 420a, which is a light shield member formed with a rectangular opening corresponding in shape to an effective pixel area of the CMOS sensor that constitutes the imaging device 33. An electrically conductive sheet 420b and a double-sided adhesive sheet 420c are affixed to the base member 420a.

The base member 420a of the light shield mask 420 is formed into a rectangular frame having an opening by, e.g., punching a PET sheet of 0.1 mm thickness. For example, the light shield mask 420 has an outer size of 35 mm×27 mm, and the opening of the base member 420a has a size of 28 mm×20 mm.

The electrically conductive sheet 420b that serves as an electrically conductive adhesive member can relatively easily be deformed when applied with an external force, and has an adhesive face on one side. The electrically conductive sheet 420b is affixed to an object-side face of the base member 420a, with the adhesive face directed toward the photographer side, so as to cover a notch 420d formed in the base member 420a and so as to be displaceable in the notch 420d toward the photographer side.

The double-sided adhesive sheet 420c (e.g., acrylic double-sided adhesive sheet) that serves as an adhesive member is affixed to a photographer-side face of the base member 420a. The electrically conductive sheet 420b and the double-sided adhesive sheet 420c are disposed so as to face positions where contact parts 430a (see FIG. 7) of the electrically conductive urging member 430 are in contact with the light shield mask 420.

It should be noted that the bending rigidity of the base member 420a decreases in or near a portion in which the notch 420d is formed. In this embodiment, among four sides of the base member 420a of a rectangular planar shape, a side (right side in the example of FIG. 6A) formed with the notch 420d has a width wider than that of a side (left side in the example of FIG. 6A) facing the side formed with the notch 420d across the opening of the base member 420a, to thereby ensure a required bending rigidity. It should be noted that the side of the base member 420a having the wide width is disposed facing a position where the piezoelectric element 440 is disposed.

Figure 7:
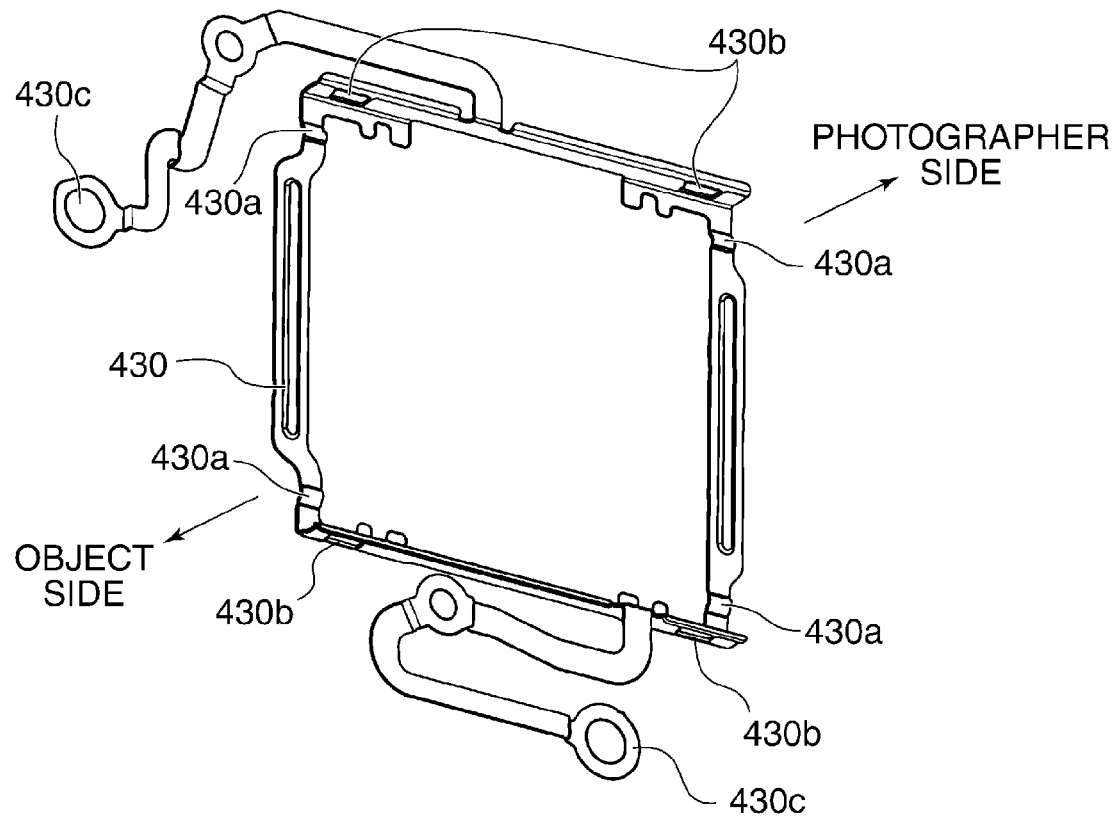
FIG. 7 is a perspective view showing the construction of an urging member of the imaging unit.

FIG. 7 shows in perspective view the construction of the electrically conductive urging member 430. The urging member 430 of this embodiment is obtained by punching and bending a thin stainless steel spring plate into a rectangular frame. The urging member 430 is formed with four contact parts 430*a* that are disposed for contact with the light shield mask 420 affixed to the LPF 410.

As previously described, the electrically conductive sheet 420*b* and the double-sided adhesive sheet 420*c* of the light shield mask 420 are disposed at locations where the base member 420*a* of the light shield mask 420 is pressed by the urging member 430. The electrically conductive sheet 420*b* is pressed by one of the contact parts 430*a* of the urging member 430 to cause the base member 420*a* to be in urged contact with the LPF 410, and the base member 420*a* is pressed by the remaining three contact parts 430*a* to cause the double-sided adhesive sheet 420*c* to be in urged contact with the LPF 410. As a result, the base member 420*a* and the LPF 410 are strongly adhered together through the double-sided adhesive sheet 420*c*.

The urging member 430 is formed with four engagement holes 430*b* for fixing the urging member 430 to the LPF holding member 460 and two holes 430*c* through which screws for securing the urging member 430 to the main unit chassis 300 extend.

Figure 8A:
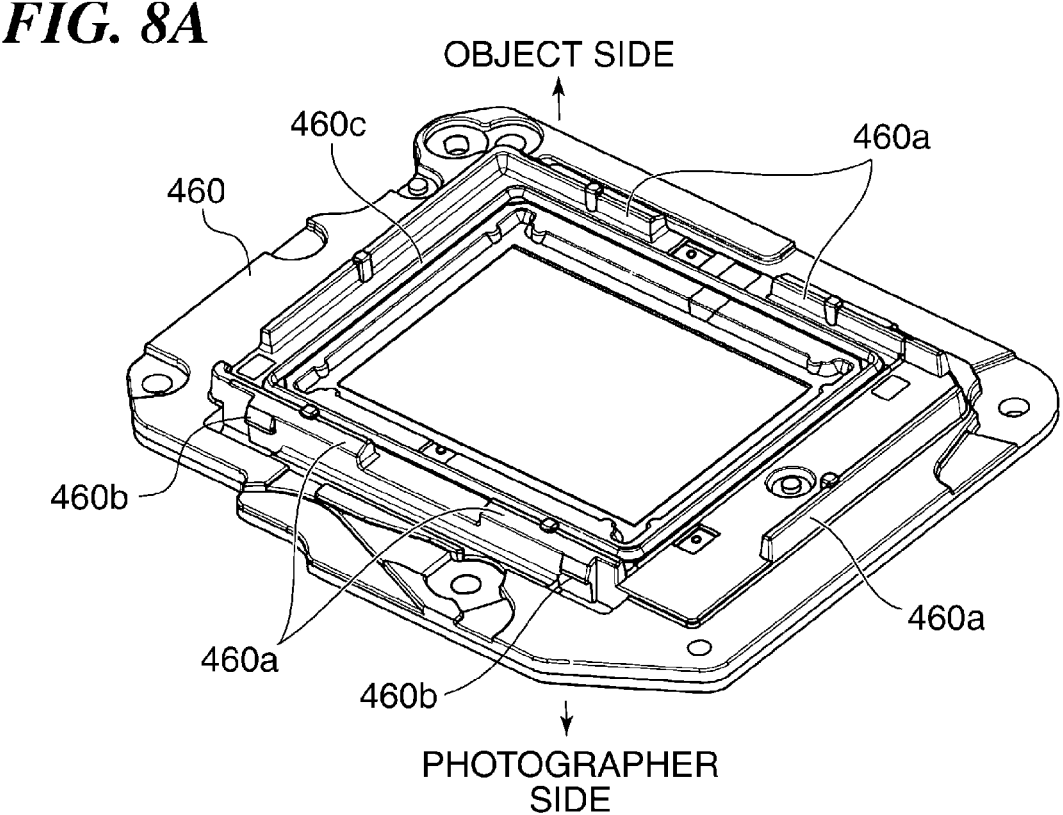
FIG. 8A is a perspective view of the construction of an optical low pass filter holding member of the imaging unit as seen from an object side.
Figure 8B:
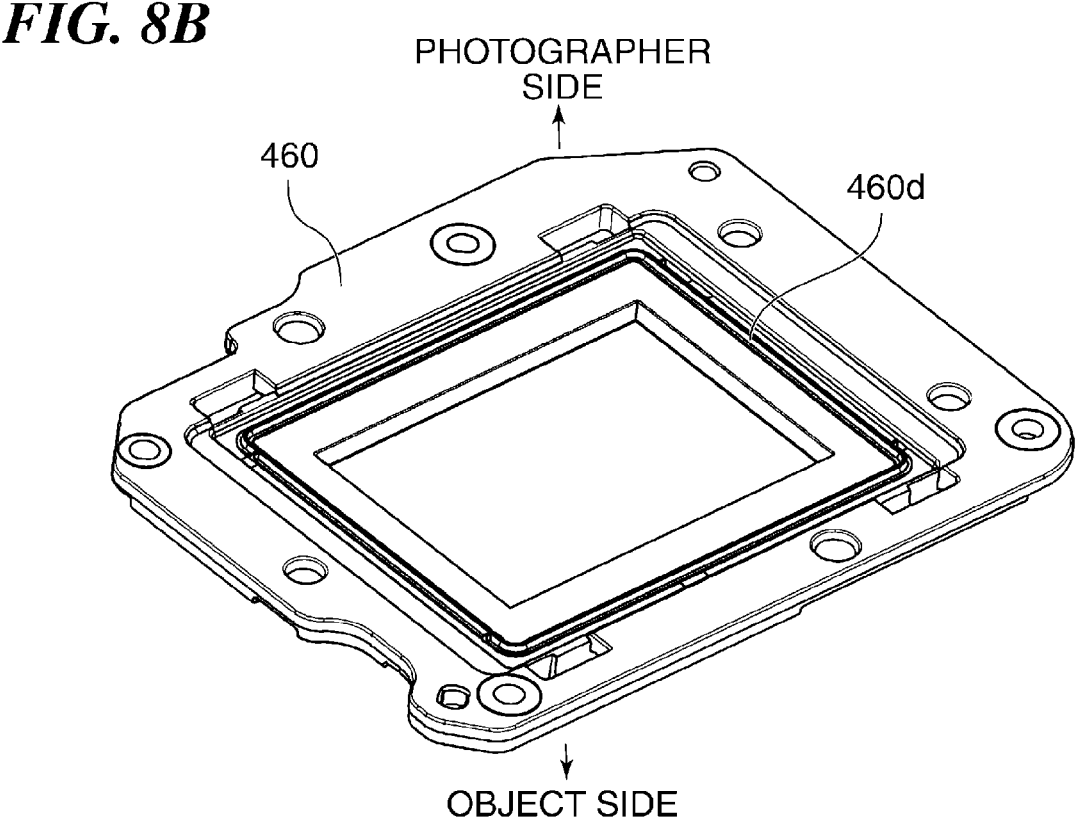
FIG. 8B is a perspective view of the optical low pass filter holding member as seen from a photographer/user side.

FIG. 8A shows the LPF holding member 460 as seen from the object side in perspective view, and FIG. 8B shows the LPF holding member 460 as seen from the photographer side in perspective view.

The LPF holding member 460 is a rectangular frame made of resin and having an opening around which ribs 460*a* are formed to extend toward the object side and to be fitted with the LPF 410. The LPF 410 is disposed to be fitted to the ribs 460*a*. On an object-side face and a photographer-side face of the LPF holding member 460, first and second rectangular seal portions 460*c*, 460*d* are respectively formed around the opening by two-color molding of thermoplastic elastomer.

Four engagement pawls 460*b* (only two of which are shown in FIG. 8A) for engagement with the engagement holes 430*b* of the urging member 430 are formed in the ribs 460*a* so as to face positions where the engagement holes 430*b* are formed. Two engagement pawls 460*b* (not shown in FIG. 8A) are provided in two ribs 460*a* that face two ribs 460*a* (shown in FIG. 8A and formed with engagement pawls 460*b*) across the opening of the LPF holding member 460.

Figure 9:
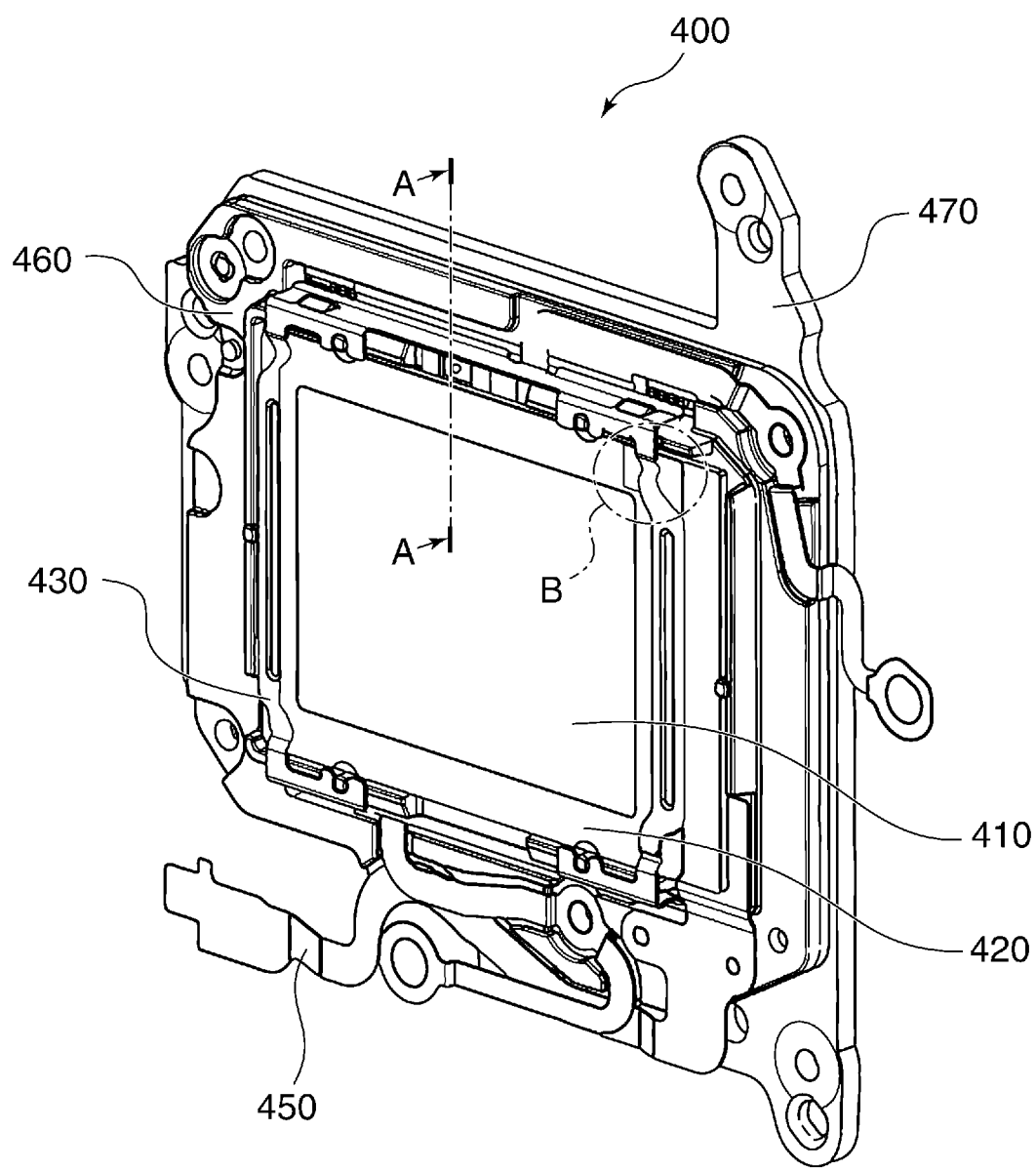
FIG. 9 is a perspective view showing the imaging unit in an assembled state.
Figure 10A:
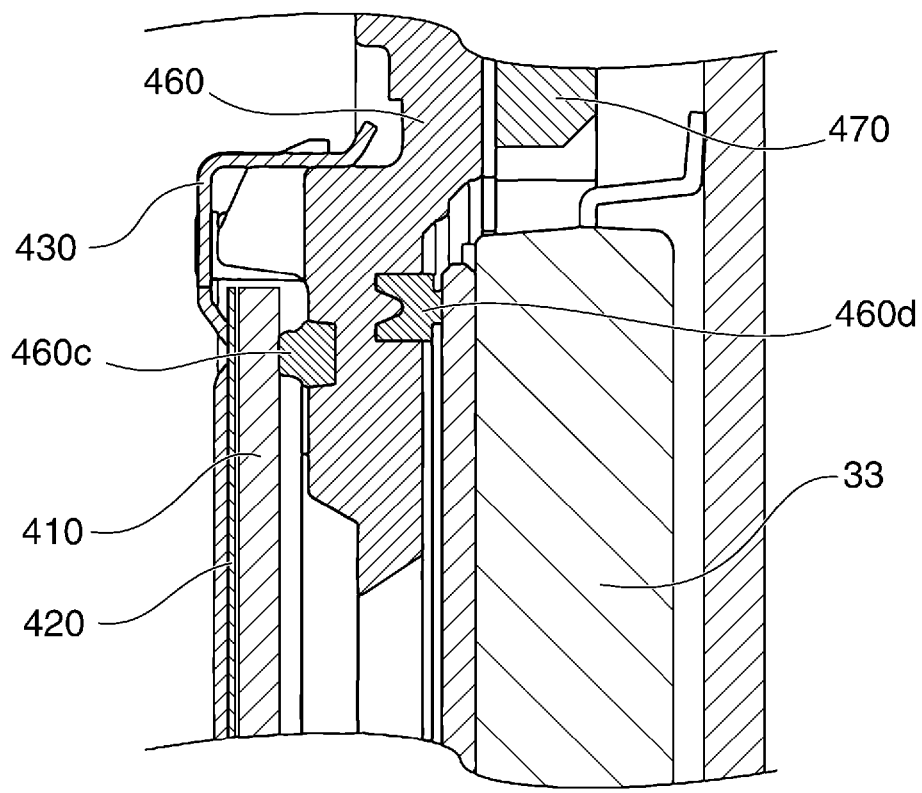
FIG. 10A is a fragmentary enlarged section view of the imaging unit taken along A-A line in FIG. 9.
Figure 10B:
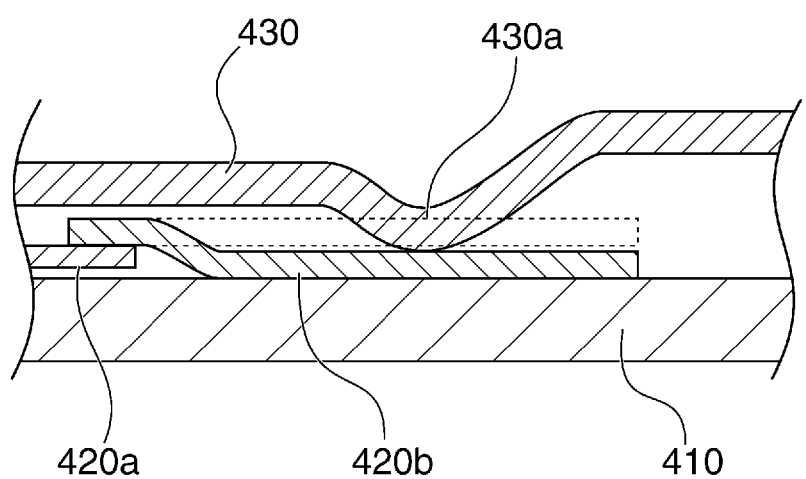
FIG. 10B is a fragmentary enlarged section view of a region B shown in FIG. 9.

FIG. 9 shows in perspective view an assembled state of the imaging unit 400, FIG. 10A is an enlarged fragmentary view taken along line A-A shown in FIG. 9, and FIG. 10B shows in enlarged fragmentary section view a region B shown in FIG. 9 where the urging member 430 is in contact with the electrically conductive sheet 420*b* of the light shield mask 420.

To assemble the imaging unit 400, the piezoelectric element 440 affixed with the flexible printed board 450 is first bonded to a photographer-side face of the LPF 410. The piezoelectric element 440 bonded to the LPF 410 does not appear in FIG. 9. Then, the electrically conductive sheet 420*b* and the double-sided adhesive sheet 420*c* of the light shield mask 420 are disposed on the base member 420*a*.

Next, the light shield mask 420 is affixed to the LPF 410 at a predetermined position. To affix the light shield mask 420 to the LPF 410, an operator handles the light shield mask 420 with tweezers, for example. Accordingly, when deformed due to wind pressure or own weight, the light shield mask 420 becomes difficult to be affixed. In this embodiment, however, the base member 420*a* of the light shield mask 420 has adequate rigidity as previously described, and therefore the light shield mask 420 is less susceptible to influences of own weight deformation, etc. Furthermore, since the electrically conductive sheet 420*b* and the double-sided adhesive sheet 420*c* which are small and difficult to handle are disposed on the base member 420*a*, these sheets 420*b*, 420*c* can be handled in unison with the base member 420*a*. As a result, the light shield mask 420 becomes easy to handle, whereby assembly efficiency can be enhanced.

Next, the LPF 410 affixed with the light shield mask 420 is fitted into the ribs 460*a* of the LPF holding member 460. Then, the urging member 430 is pressed to the LPF 410 and to the LPF holding member 460 from the side of the light shield mask 420, whereby the engagement holes 430*b* of the urging member 430 are engaged with the engagement pawls 460*b* of the LPF holding member 460.

As a result, the urging member 430 is fixed to the LPF holding member 460, while urging the LPF 410 toward the photographer side through the light shield mask 420. The urging member 430 supports the LPF 410 from the object side with the four contact parts 430*a*.

Then, the imaging device 33, the imaging device holding member 470, and the electromagnetic shield plate 480 are assembled to the assembly of the urging member 430 and the LPF holding member 460, whereby the imaging unit 400 is assembled.

As shown in FIG. 10A, the LPF 410 is pressed by the urging member 430 from the object side and pressed by the first seal portion 460*c* of the LPF holding member 460 from the photographer side. The imaging device 33 attached to the LPF 410 is pressed against the second seal portion 460*d* of the LPF holding member 460. Thus, the elements including from the LPF 410 to the imaging device 33 are disposed in a space sealed by the first and second seal portions 460*c*, 460*d* (hereinafter, sometimes referred to as the sealed space). It is therefore possible to prevent dust, etc., from adhering to the elements of the imaging unit 400 including from the LPF 410 to the imaging device 33 after assembly by preventing dust, etc., from entering the sealed space during the assembly of the imaging unit 400.

With reference to FIG. 10B, a detailed description will be given of the region B where the light shield mask 420 and the electrically conductive urging member 430 are in contact with each other. FIG. 10B shows the region B in section view as seen from the side of one short side of the LPF 410. Before assembly of the light shield mask 420 and the urging member 430, the electrically conductive sheet 420*b* of the light shield mask 420 is in a position shown by a dotted line in FIG. 10B.

As previously described, the electrically conductive sheet 420*b* of the light shield mask 420 is relatively easily deformed. Thus, when pressed by the urging member 430 toward the LPF 410, the electrically conductive sheet 420*b* is displaced in the notch 420*d* toward the photographer side and deformed as shown in FIG. 10B. At that time, since the face of the electrically conductive sheet 420*b* on the LPF 410 side is an adhesive face, the electrically conductive sheet 420*b* is adhered to the LPF 410. As a result, the face of the LPF 410 is reliably electrically connected to the electrically conductive urging member 430 through the electrically conductive sheet 420*b*.

As previously described, the electrically conductive urging member 430 is electrically connected to the main unit chassis 300 that provides a reference potential. Thus, the face of the LPF 410, which is electrically connected through the electrically conductive sheet 420*b* to the electrically conductive urging member 430, has a reference potential. Conversely, at least one set of the electrically conductive sheet 420*b* and the notch 420*d* of the light shield mask 420 must be provided so as to face at least one of the contact parts 430*a* of the urging member 430.

In this embodiment, the sum of a thickness of the base member 420*a* of the light shield mask 420 and a thickness of the double-sided adhesive sheet 420*c* is made nearly equal to a thickness of the electrically conductive sheet 420b, and the four contact parts 430a of the urging member 430 are formed into the same shape as one another.

As a result, amounts of deformation of the four contact parts 430a of the urging member 430 become nearly equal to one another, and pressing forces applied from the urging member 430 to the LPF 410 determined by the amounts of deformation of the contact parts 430a become nearly equal to one another. This is advantageous to prevent foreign matters such as dust from entering the sealed space sealed by the first and second seal portions 460c, 460d of the LPF holding member 460 and to achieve sufficient foreign matter removal, which will be described later.

In the following, a description will be given of modifications of the light shield mask 420. In this embodiment, one set of the electrically conductive sheet 420b and the notch 420d is disposed to face one of the four contact parts 430a of the urging member 430. However, plural sets of electrically conductive sheets and notches can be disposed.

In this embodiment, one short side among the four sides of the rectangular base member 420a is made wide in width, and the notch 420d is provided at an outer edge portion of the one short side of wide width. However, the formed position and shape of the notch 420d are not limitative. For example, as the notch 420b, a circular or rectangular hole can be formed in the base member 420a. In other words, the notch 420b can be formed into an appropriate shape at an appropriate position according to, e.g., the thickness of the base member 420a and the position where the base member 420a is urged by the urging member 430. However, the electrically conductive sheet 420b must be configured, when pressed by the urging member 430, to be deformed by an amount corresponding to the sum of thicknesses of the base member 420a and the double-sided adhesive sheet 420c to ensure electrical conduction between the LPF 410 and the urging member 430.

Figure 11A:
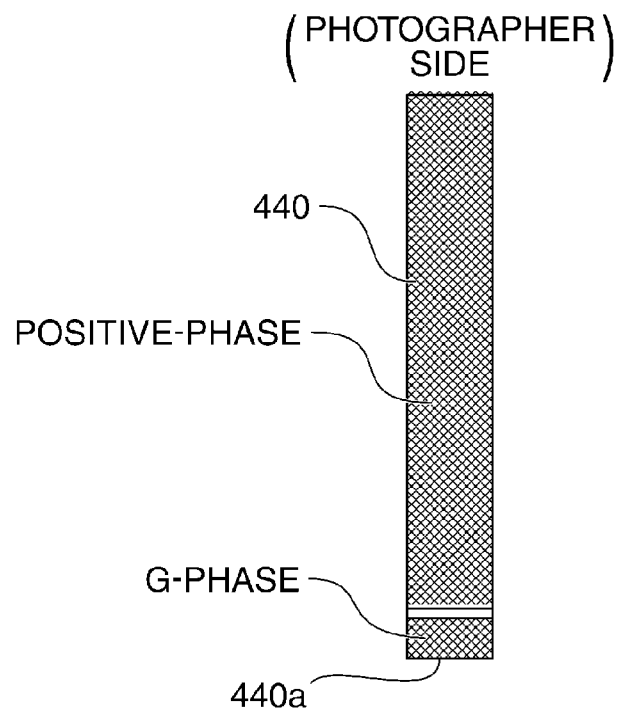
FIG. 11A is a rearview of a piezoelectric element of the imaging unit.
Figure 11B:
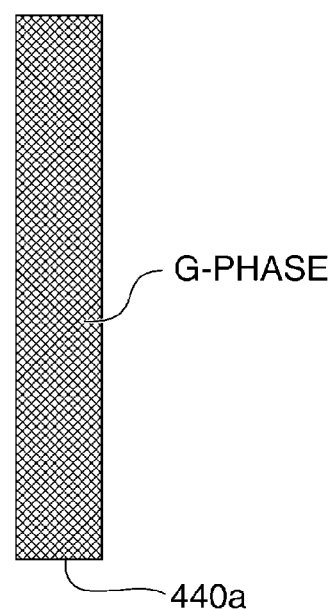
FIG. 11B is a front view of the piezoelectric element.

FIG. 11A shows the piezoelectric element 440 in rear view as seen from the photographer side, and FIG. 11B shows the piezoelectric element 440 in front view as seen from the photographer side. It should be noted that parts hatched in FIGS. 11A and 11B represent electrodes (metal films).

The piezoelectric element 440 is formed by a single piezoelectric member made of, e.g., PZT (lead zirconate titanate). It should be noted that the constituent material of the piezoelectric member is not limited to PZT.

The piezoelectric element 440 has a photographer-side face formed with a G-phase electrode and a positive-phase electrode for exciting a standing wave vibration in the LPF 410, and has an object-side face formed with a G-phase electrode. The G-phase electrodes respectively formed on the photographer-side face and on the object-side face are connected with each other through an electrically conductive path formed on a bottom face 440a of the piezoelectric element 440, and are maintained at the same electrical potential. It should be noted that it is possible to electrically connect the G-phase electrodes on the photographer-side face and on the object-side face to each other by means of a through-hole method using a through hole formed in the piezoelectric member.

The flexible printed board 450 (see FIG. 1) is adhered by e.g. adhesive to the photographer-side face of the piezoelectric element 440, whereby predetermined voltages can be applied to respective ones of the positive-phase electrode and the G-phase electrode. By providing an electrical potential difference between the positive-phase electrode and the G-phase electrode, it is possible to cause the piezoelectric element 440 to expand and contract by piezoelectric effect in a direction perpendicular to the photographer-side and object-side faces of the piezoelectric element 440. Since the LPF 410 is bonded to the object-side face of the piezoelectric element 440, the expansion and contraction of the piezoelectric element 440 is conveyed to the LPF 410, and a vibration in an optical axis direction is generated in the LPF 410.

Figure 12:
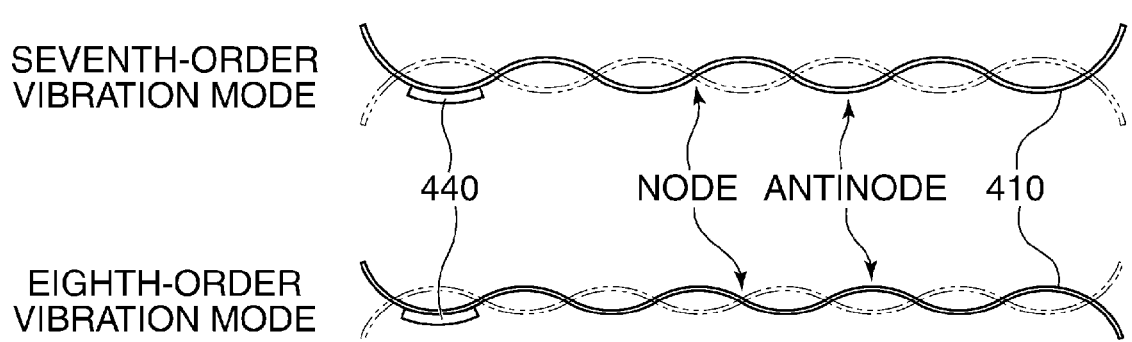
FIG. 12 is a section view schematically showing vibration modes generated in an optical low pass filter when the piezoelectric element is driven.

FIG. 12 shows vibration modes generated in the LPF 410 by the drive of the piezoelectric element 440 in a section extending parallel to a lateral direction of the piezoelectric element 440 and perpendicular to the object-side and photographer-side faces of the piezoelectric element 440. It should be noted that only the LPF 410 and the piezoelectric element 440 are illustrated in FIG. 12 with an illustration of other structural elements of the imaging unit 400 omitted.

When a positive voltage is applied through the flexible printed board 450 to the positive-phase electrode of the piezoelectric element 440 and the G-phase electrode is made at ground potential (GND=0 V), the piezoelectric element 440 expands in a face direction (i.e., in a horizontal direction parallel to an image pickup face) and contracts in a thickness direction (i.e., in a direction perpendicular to the image pickup face), whereby the LPF 410 is applied from the piezoelectric element 440 with a force that acts to expand a face of the LPF 410 bonded to the piezoelectric element 440. As a result, as shown in FIG. 12, in a portion of the LPF 410 where the piezoelectric element 440 is mounted, the face of the LPF 410 on the side close to the piezoelectric element 440 is deformed to expand and a face of the LPF 410 on the side opposite from the piezoelectric element 440 is deformed to contract, so that the LPF 410 has a convex shape whose apex is at the piezoelectric element 440. By a series of such deformations, flexure deformation in which concave and convex shapes are repeated is caused in the LPF 410. In other words, when a positive voltage is applied to the positive-phase electrode of the piezoelectric element 440, flexure deformation shown by each solid line in FIG. 12 is generated in the LPF 410.

Conversely, when a negative voltage is applied to the positive-phase electrode of the piezoelectric element 440 and the G-phase electrode is made at GND potential, the piezoelectric element 440 contracts in the face direction and expands in the thickness direction, whereby the LPF 410 is applied from the piezoelectric element 440 with a force that acts to contract the face of the LPF 410 bonded to the piezoelectric element 440. As a result, as shown in FIG. 12, in the portion of the LPF 410 where the piezoelectric element 440 is mounted, the face of the LPF 410 on the side close to the piezoelectric element 440 is deformed to contract and the face on the side opposite from the piezoelectric element 440 is deformed to expand, so that the LPF 410 has a concave shape whose apex is at the piezoelectric element 440. In other words, flexure deformation shown by each dotted line in FIG. 12 is generated in the LPF 410, which is opposite from the flexure deformation generated when a positive voltage is applied to the positive-phase electrode of the piezoelectric element 440.

Accordingly, by alternately applying a positive voltage and a negative voltage to the positive-phase electrode while maintaining the G-phase electrode at GND potential, it is possible to generate a standing wave vibration where flexure deformation shown by each solid line in FIG. 12 and flexure deformation shown by each dotted line in FIG. 12 are alternately repeated. When such a standing wave vibration is generated in the LPF 410, acceleration acts on a surface of the LPF 410 and acts on foreign matters such as dust adhered to the surface of the LPF 410, whereby foreign matters on the surface of the LPF 410 can be removed.

It should be noted that by applying voltages having a frequency near a resonance frequency in a natural vibration mode of the LPF 410 to the positive-phase electrode and to the G-phase electrode of the piezoelectric element 440, a standing wave vibration that is large in amplitude and in acceleration can be generated due to resonance, even if the applied voltages are small, whereby the foreign matter removal efficiency can be improved. It should be noted that there are a plurality of natural vibration modes for the LPF 410. By applying to the piezoelectric element 440 voltages having a frequency near a natural frequency in any of the natural vibration modes, it is possible to cause the LPF 410 to vibrate in a vibration mode whose order corresponds to the order of the natural vibration mode.

When a standing wave vibration is generated in the LPF 410, vibration antinodes and nodes are alternately generated in the LPF 410. A vibration amplitude becomes nearly zero at each of the vibration nodes, and becomes maximum at each of the vibration antinodes. In FIG. 12, there are shown a seventh-order vibration mode where seven antinodes and eight nodes are generated and an eighth-order vibration mode where eight antinodes and nine nodes are generated.

To remove, by vibration, foreign matters such as dust adhered to a surface of the LPF 410, it is necessary to generate acceleration that produces a force larger than an adherence force and acting in a direction for removing foreign matters. The acceleration is determined by the frequency and amplitude of a vibration generated in the LPF 410. At each vibration node, the vibration amplitude is nearly zero and therefore acceleration generated by the vibration is nearly zero. Thus, it is impossible to remove, by vibration, foreign matters against the adherence force. For this reason, foreign matters remain at vibration nodes, when the LPF 410 is caused to vibrate in only one vibration mode.

To solve this problem, the drive of the piezoelectric element 440 is controlled so as to cause the LPF 410 to vibrate in a certain vibration mode (first vibration mode) and then cause the LPF 410 to vibrate in another vibration mode (second vibration mode), whereby foreign matters that remain at nodes of a vibration generated in the first vibration mode can be removed by the vibration of the second vibration mode.

If any of vibration nodes in the first vibration mode overlaps any of vibration nodes in the second vibration mode, foreign matters such as dust cannot be removed at the overlapped node, and therefore the first and second vibration modes must be set such that vibration nodes in these modes do not overlap one another. Preferably, two vibration modes, i.e., an odd-order vibration mode and an even-order vibration mode, are used. For example, the seventh-order and eighth-order vibration modes shown in FIG. 12 can be used in combination. Alternatively, three or more vibration modes can be used in combination. For example, a tenth-order vibration mode having eleven nodes, an eleventh-order vibration mode having twelve nodes, and a twelfth-order vibration mode having thirteen nodes can be used in combination.

Preferably, the LPF 410 whose resonance frequency varies according to the shape, thickness, constituent material, etc. of the LPF 410 is configured to have a resonance frequency belonging to an inaudible frequency range, thereby preventing unpleasant sound from being generated by vibration of the LPF 410. In general, vibration of a vibrating body decays when another body is brought in contact with the vibrating body. On the other hand, when another body is in contact with the vibrating body at a vibration node where the vibration amplitude is nearly zero, the decay of vibration is moderated. Accordingly, the urging member 430 is disposed such that the contact parts 430a are in contact with or near vibration nodes of the LPF 410, whereby the decay of vibration of the LPF 410 can be suppressed. In that case, it is possible to support the LPF 410, while preventing the foreign matter removal ability from being lowered.

In this embodiment, the maximum amplitude of a vibration generated in the LPF 410 is about several μm, and the thickness of the double-sided adhesive sheet 420c of the light shield mask 420 is about 50 μm. As a result, even when the LPF 410 vibrates, the LPF 410 does not contact with the base member 420a of the light shield mask 420. Therefore, unusual sound is not generated by contact of the LPF 410 with the base member 420a, and the LPF 410 and the base member 420a are not damaged.

Figure 13:
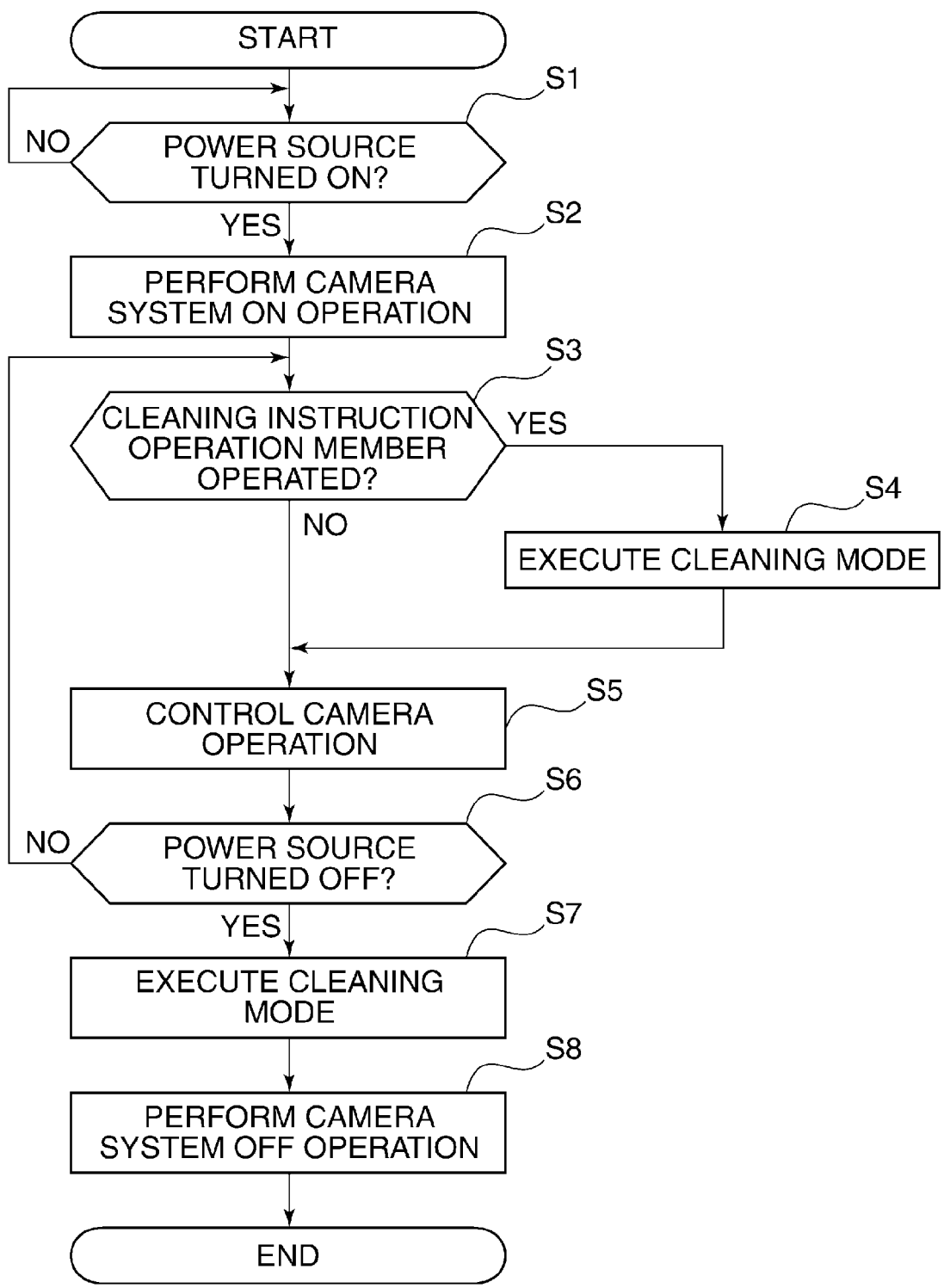
FIG. 13 is a flowchart showing control procedures for executing a cleaning mode to remove foreign matters adhered to the optical low pass filter.

FIG. 13 shows in flowchart the control procedures for executing a cleaning mode in which foreign matters such as dust adhered to a surface of the LPF 410 is removed. The cleaning mode is performed by the MPU 100 by executing a predetermined program.

The MPU 100 determines whether or not the main switch 43 is operated to turn on the power source 42 (step Si), and if the answer to step S1 is NO, waits for the power source 42 being turned on. When the power source 42 is turned on (YES to step S1), the MPU 100 performs a camera system ON operation (step S2). In the camera system ON operation, the camera is started, the power supply circuit 110 is controlled to supply power from the power source 42 to circuits of the camera, the camera system is initialized, and a photographing operation is enabled.

Next, the MPU 100 determines whether or not the cleaning instruction operation member 44 is operated by the photographer (step S3). If the instruction operation member 44 is operated (YES to step S3), the flow proceeds to step S4. If the instruction operation member 44 is not operated (NO to step S3), the flow proceeds to step S5.

In step S4, the MPU 100 operates the camera in the cleaning mode in response to the instruction operation member 44 being operated, i.e., in response to a cleaning mode start instruction. More specifically, the power supply circuit 110 operates to cause the power source 42 to supply power to camera parts that are to be operated in the cleaning mode, and the battery checking circuit 108 detects a residual battery capacity of the power source 42 and transmits a detection result to the MPU 100. In accordance with the result of detection of residual battery capacity, the MPU 100 sends a drive instruction to the piezoelectric element driving circuit 111. The driving circuit 111 generates a periodical voltage for exciting a standing wave vibration in the LPF 410, and applies the periodical voltage to the piezoelectric element 440. As previously described with reference to FIG. 12, the piezoelectric element 440 expands and contracts according to the periodical voltage applied thereto, and generates a standing wave vibration in the LPF 410. As a result, foreign matters such as dust adhered to the LPF 410 are removed by vibration. When the operation in the cleaning mode is completed, the flow proceeds to step S5.

Instep S5, the MPU 100 controls a camera operation in accordance with signals from the switch sensing circuit 105 that represent operation states of various switches such as the switches SW1, SW2, the main-operation dial 8, the photographing mode setting dial 14, and the sub-operation dial 20. The camera operation is an ordinary operation in which, for example, the photographer specifies a photographing mode and performs photographing. Therefore, a detailed description of control for the camera operation is omitted herein.

Next, the MPU 100 determines whether or not the main switch 43 is operated to turn off the power source 42 when the camera is in a standby state (step S6). If the power source 42 is not turned off (NO to step S6), the flow returns to step S3.

On the other hand, if the power source 42 is turned off (YES to step S6), the MPU 100 operates the camera in the cleaning mode as in step S4 (step S7). It should be noted that in the cleaning mode in step S7, parameters such as a driving frequency and driving time period of the piezoelectric element 440 and a control method can be changed from those used in the cleaning mode in step S4 by taking into account of power consumption, operation time period of the camera, etc.

In step S8, the MPU 100 performs a camera system OFF operation. More specifically, the MPU 100 performs control to cause circuits of the camera to stop operating, stores required information, etc. into the EEPROM 100a, and controls the power supply circuit 110 to disconnect power supply from the power source 42 to the circuits of the camera.

As described above, in this embodiment, the cleaning mode is executed not only at an arbitrary timing intended by the photographer, but also when the power source of the camera is turned off. More specifically, the camera system is turned off after completion of the operation to remove foreign matters adhered to the surface of the LPF 410. This is because of the following reasons.

According to knowledge and results of experiments conducted by the present inventor et al., there are various foreign matters that can adhere to the surface of the LPF 410, and foreign matters left adhering to a camera component for long period of time are generally difficult to remove even by causing the LPF 410 to vibrate in the cleaning mode. This may occur because an adhesion force such as a liquid bridge force increases due to condensation caused by environmental changes in temperature, humidity, etc., or because of dust firmly adhering to a camera component after repeatedly swelling and drying due to environmental changes. In the case of foreign matters constituted by e.g. rubber, oil or the like contained in the foreign matters bleeds and adhesion force increases over time. Therefore, there is a fear that foreign matters become difficult to be removed in a case that an operation to turn on the power source is performed after the camera has not been used for a long period of time. Foreign matters can be removed more efficiently and more effectively by executing the cleaning mode at a timing where the camera's power source is turned off than by executing the cleaning mode when an operation to turn on the power source is performed after the camera has not been used for a long period of time.

In this embodiment, the cleaning mode is executed when the main switch 43 is operated to turn off the power source, and then the camera system OFF operation is performed. However, it is possible to perform the camera system OFF operation upon elapse of a predetermined time period from when the power source has been turned on. Also in that case, by executing the cleaning mode to remove foreign matters by vibration before the camera system OFF operation is performed, it is possible to prevent foreign matters from becoming difficult to be removed.

As describe above, in this embodiment, the electrically conductive sheet 420b is disposed so as to cover the notch 420d of the light shield mask 420 that is disposed between the LPF 410 and the urging member 430. As a result, it is unnecessary to handle the electrically conductive sheet 420b singly, and it is therefore possible to ensure electrical conduction between the LPF 410, the electrically conductive sheet 420b, the urging member 430, and the main unit chassis 300, while achieving satisfactory ease of assembly. Accordingly, it is possible to maintain the electrical potential at the surface of the LPF 410 at the reference potential, whereby foreign matters such as dust can be suppressed from adhering to the LPF 410 due to static electricity. Since the LPF 410 is not brought in contact with the light shield mask 420 even if the LPF 410 is caused to vibrate by the piezoelectric element 440, it is possible to prevent unusual sound from being generated and prevent the LPF 410 from being damaged.

In the above, this invention has been described based on a preferred embodiment. However, this invention is not limited thereto. For example, although the LPF 410 of the above-described embodiment is constituted by a birefringent plate made of quartz, it can be constituted by, e.g., a birefringent plate made of lithium niobate. Further, the LPF 410 can be constituted by affixing together a birefringent plate, a phase plate, and an infrared absorption filter, or can be constituted by an infrared absorption filter alone.

In the above-described embodiment, the first and second seal portions 460c, 460d of the LPF holding member 460 are formed by two-color molding of elastomer. However, any member such as a ring-like rubber member, adhesive tape, adhesive material, etc. can be used for the seal portions so long as the intrusion of dust into the sealed space can be prevented.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-040020, filed Feb. 27, 2012 which is hereby incorporated by reference herein in its entirety.

What is claimed is:

1. An image pickup apparatus having an imaging device that converts an optical image of an object into an electrical signal, the image pickup apparatus comprising:
    an optical member disposed on an object side of the imaging device;
    a light shield member having an opening formed into a shape corresponding to a shape of an effective pixel area of the imaging device, the light shield member being disposed on an object-side face of the optical member;
    an electrically conductive urging member disposed on an object side of the optical member and configured to urge the light shield member toward the optical member;
    an electrically conductive member configured to be in contact with the object face of the optical member; and
    a reference potential member configured to provide electrical reference potential and configured to be electrically connected to the electrically conductive urging member,
    wherein part of the electrically conductive member is disposed on the light shield member and another part of the electrically conductive member is in contact with the object-side face of the optical member, and
    wherein the electrically conductive urging member urges the electrically conductive member to the object-side face of the optical member so that the electrically conductive urging member is in contact with the electrically conductive member and electrically conductive member is in contact with the object-side face of optical member.

2. The image pickup apparatus according to claim 1, wherein:
    the light shield member has a cut-out portion,
    the electrically conductive member is disposed on the light shield member to cover the cut-out portion, and
    the electrically conductive member has one face configured to be in contact with the object-side face of the optical member and another face configured to be in contact with the electrically conductive urging member.

3. The image pickup apparatus according to claim 2, wherein the electrically conductive member is disposed on an object-side face of the light shield member.

4. The image pickup apparatus according to claim 2, wherein:
- the light shield member is attached to the object-side face of the optical member with an adhesive member,
- a sum of a thickness of the light shield member and a thickness of the adhesive member is substantially equal to a thickness of the electrically conductive-member, and
- the adhesive member and the electrically conductive member are respectively disposed to face locations where the urging member presses the light shield member.

5. The image pickup apparatus according to claim 2, wherein:
- the light shield member has a rectangular planar shape having four sides,
- the cut-out portion is disposed on one of the four sides of the light shield member, and
- the one side with the cut-out portion has a width wider than a width of a side opposite the side formed with the cut-out portion across the opening of the light shield member.

6. The image pickup apparatus according to claim 1, further including:
- a holding member disposed between the imaging device and the optical member and configured to hold the optical member and to engage the electrically conductive urging member,
- wherein the holding member has an object side formed with a first seal portion configured to be in contact with the imaging device and has a photographer side formed with a second seal portion configured to be in contact with the imaging device, and
- wherein a space in which at least the imaging device and the optical member are disposed is sealed by the first and second seal portions.

7. The image pickup apparatus according to claim 1, further including a vibration unit mounted to the optical member and configured to cause the optical member to vibrate.

8. The image pickup apparatus according to claim 7, wherein the vibration unit is mounted to the optical member at a portion corresponding to a node of a standing wave vibration generated in optical member by driving the vibration unit.

* * * * *